US010948008B2

(12) United States Patent
Walser

(10) Patent No.: US 10,948,008 B2
(45) Date of Patent: Mar. 16, 2021

(54) STEERING SHAFT AND METHOD FOR PRODUCING A PROFILED HOLLOW SHAFT FOR A TELESCOPIC STEERING SHAFT OF A MOTOR VEHICLE

(71) Applicants: ThyssenKrupp Presta AG, Eschen (LI); ThyssenKrupp AG, Essen (DE)

(72) Inventor: Michael Walser, Cholula (MX)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 365 days.

(21) Appl. No.: 15/519,751

(22) PCT Filed: Jul. 31, 2015

(86) PCT No.: PCT/EP2015/067613
§ 371 (c)(1),
(2) Date: Apr. 17, 2017

(87) PCT Pub. No.: WO2016/058723
PCT Pub. Date: Apr. 21, 2016

(65) Prior Publication Data
US 2017/0241472 A1    Aug. 24, 2017

(30) Foreign Application Priority Data
Oct. 17, 2014 (DE) .................... 10 2014 115 140.2

(51) Int. Cl.
*B21D 17/04* (2006.01)
*F16C 3/03* (2006.01)
(Continued)

(52) U.S. Cl.
CPC ............... *F16C 3/03* (2013.01); *B21D 15/02* (2013.01); *B21D 17/04* (2013.01); *B21H 1/20* (2013.01);
(Continued)

(58) Field of Classification Search
CPC ........ B21D 15/02; B21D 17/04; B21H 7/187; B21H 5/02; B21H 1/20; B21C 1/24;
(Continued)

(56) References Cited

U.S. PATENT DOCUMENTS 10,569 A * 2/1854 Jackson ................ B21B 13/103
                                                      72/224
14,551 A * 4/1856 Brooks ................ B21B 13/103
                                                      72/224
(Continued)

FOREIGN PATENT DOCUMENTS

CH         579427 A5    9/1976
CN       101022900 A    8/2007
(Continued)

OTHER PUBLICATIONS

Translation Jp 57-7317A, Jan. 1982.*
(Continued)

*Primary Examiner* — Edward T Tolan
(74) *Attorney, Agent, or Firm* — thyssenkrupp North America, LLC

(57) ABSTRACT

A method for producing a profiled hollow shaft for a telescopic steering shaft of a motor vehicle may involve providing a hollow shaft to be processed, a profile mandrel, and a roller head comprising at least one roller. The method may further involve introducing the profile mandrel into the hollow shaft in order to produce a groove in the hollow shaft. The method may also involve moving the profile mandrel and the hollow shaft together relative to the roller head, wherein movement of the profile mandrel and the hollow shaft relative to the roller head is performed exclusively in a direction of a longitudinal axis of the hollow shaft in order to form a groove.

5 Claims, 5 Drawing Sheets

(51) Int. Cl.
*F16D 3/06* (2006.01)
*B21D 15/02* (2006.01)
*B21H 1/20* (2006.01)
*B21H 7/18* (2006.01)
*B62D 1/16* (2006.01)
*B21K 1/06* (2006.01)
*F16D 3/40* (2006.01)

(52) U.S. Cl.
CPC .............. *B21H 7/187* (2013.01); *B21K 1/063* (2013.01); *B62D 1/16* (2013.01); *F16D 3/06* (2013.01); *F16C 2326/24* (2013.01); *F16D 3/40* (2013.01); *F16D 2250/00* (2013.01)

(58) Field of Classification Search
CPC ......... B21C 3/08; B21C 37/202; B21B 17/08; B21B 17/10; B21B 13/10; B21B 13/103; B21K 1/063; F16C 3/03
See application file for complete search history.

(56) References Cited

U.S. PATENT DOCUMENTS

| | | | | |
|---|---|---|---|---|
| 473,020 A * | 4/1892 | Plecker | ................. | B21C 37/104 72/368 |
| 531,170 A * | 12/1894 | Fickinger | ............ | B21C 37/0815 72/51 |
| 838,569 A * | 12/1906 | Numan | ................. | B21B 21/005 72/208 |
| 890,526 A * | 6/1908 | Numan | ................. | B21B 21/005 72/208 |
| 1,605,828 A * | 11/1926 | Frahm | .................... | B21D 15/02 72/178 |
| 1,638,481 A * | 8/1927 | Frahm | .................... | B21D 15/02 72/208 |
| 2,367,226 A * | 1/1945 | Lonsdale | ............. | B21C 37/202 72/209 |
| 3,330,145 A * | 7/1967 | Adolphi | ................. | B21H 7/007 72/274 |
| 4,383,429 A | 5/1983 | Ceccacci | | |
| 4,995,252 A * | 2/1991 | Robertson | ............... | B21B 17/08 72/194 |
| 5,001,916 A * | 3/1991 | Schuler | ..................... | B21B 1/42 72/100 |
| 5,231,859 A * | 8/1993 | Bailey | ..................... | B21B 17/06 72/13.3 |
| 5,765,419 A * | 6/1998 | Krapfenbauer | ........ | B21D 15/02 72/191 |
| 5,953,948 A * | 9/1999 | Isozaki | ................. | B21B 13/103 72/224 |
| 6,754,943 B1 * | 6/2004 | Perry | ..................... | B23P 11/00 29/421.1 |
| 7,874,760 B2 * | 1/2011 | Steinrisser | ................ | F16D 1/06 403/359.1 |
| 8,113,027 B2 * | 2/2012 | McDonald | ............... | B21H 1/20 72/234 |
| 10,634,184 B2 * | 4/2020 | Muntener | ............. | B21D 53/10 |
| 2003/0040371 A1 | 2/2003 | Glowacki et al. | | |
| 2017/0058940 A1 * | 3/2017 | Wehner | ..................... | F16O 3/03 |

FOREIGN PATENT DOCUMENTS

| | | |
|---|---|---|
| DE | 1097394 B | 1/1961 |
| DE | 20 17 709 A1 | 11/1971 |
| DE | 31 02 867 A1 | 11/1981 |
| DE | 32 23 004 A1 | 1/1983 |
| DE | 10238968 A1 | 4/2003 |
| DE | 10317506 A1 | 11/2004 |
| DE | 10 2008 049 825 A1 | 4/2010 |
| FR | 1 331 015 A | 6/1963 |
| GB | 1 142 837 A | 2/1969 |
| JP | S48-34663 B1 | 10/1973 |
| JP | 57-7317 A * | 1/1982 ............... B21C 3/08 |
| JP | S58-35023 A | 3/1983 |
| JP | H10314837 A | 12/1998 |
| WO | 8705369 A1 | 9/1987 |
| WO | 2006016871 A1 | 2/2006 |
| WO | 2007013446 A | 2/2007 |

OTHER PUBLICATIONS

Int'l Search Report for PCT/EP2015/067613 dated Sep. 30, 2015 (mailed Oct. 12, 2015).
English language Abstract for CH 579427 A5 listed above.
English language Abstract for DE 10317506 A1 listed above.
English language Abstract for DE1097394 B listed above.

* cited by examiner

STEERING SHAFT AND METHOD FOR PRODUCING A PROFILED HOLLOW SHAFT FOR A TELESCOPIC STEERING SHAFT OF A MOTOR VEHICLE

CROSS REFERENCE TO RELATED APPLICATIONS

This application is a U.S. National Stage Entry of International Patent Application Serial Number PCT/EP2015/067613, filed Jul. 31, 2015, which claims priority to German Patent Application No. DE 10 2014 115 140.2 filed Oct. 17, 2014, the entire contents of both of which are incorporated herein by reference.

FIELD

The present disclosure generally relates to methods for producing profiled hollow shafts for telescopic steering shafts of motor vehicles, including profile mandrels and roller heads comprising at least one roller.

BACKGROUND

Telescopic steering shafts in motor vehicles on the one hand enable an adjustability of the steering column, and on the other hand they are meant to prevent the steering shaft in the event of a crash from moving further into the interior of the passenger compartment and resulting in injury to the passengers. This is generally accomplished by providing two mutually telescopic shafts or hollow shafts which together form a steering shaft. Furthermore, the steering wheel position in the longitudinal direction can be adjusted by the telescopic capability.

The hollow shafts are provided with profiles, which correspond to each other and on the one hand enable a displacement in the longitudinal direction and on the other hand a transmittal of torque. The profiles must be able to move easily with respect to each other and free of play, in particular avoiding any twisting or bending play.

The demand for an exact torque transmittal leads to the most torsion-stiff possible design of the hollow shafts. Accordingly, the hollow shafts used traditionally have large wall thicknesses. In order to create the profiling, such as a lengthwise toothing, in the hollow shafts, a stepwise machining is generally carried out, wherein the hollow shafts are firstly shoved onto a profile mandrel. Forming tools, such as rollers, then work on the outer circumferential surfaces of the hollow shafts. In this way, on the one hand the hollow shaft can be adapted to the profile of the profile mandrel, and on the other hand a corresponding profile can be created on the outer circumferential surface. Thanks to the great material thickness of the hollow shafts and the associated large rolling forces, the profiling of the hollow shafts is generally done only in stages, so that a flow of material occurs. For this, the forming tools work step by step in the longitudinal and circumferential direction along the hollow shaft and thus create the desired profiling. The stepwise generation of the profiling of the hollow shafts results in long cycle times, which drive up the production costs of the profiled hollow shafts.

CH 579427 A5 shows, for example, a method for the production of a tubular, straight inner and outer profile. The drawback of this solution is the continual rotary movement of the workpiece, which results in long cycle times.

BRIEF DESCRIPTION OF THE FIGURES

In the following, the same, similar, or equivalent elements shall be designated with identical reference numbers. To avoid redundancy, the following disclosure will avoid repeat description of these elements.

DETAILED DESCRIPTION

Figure 1:
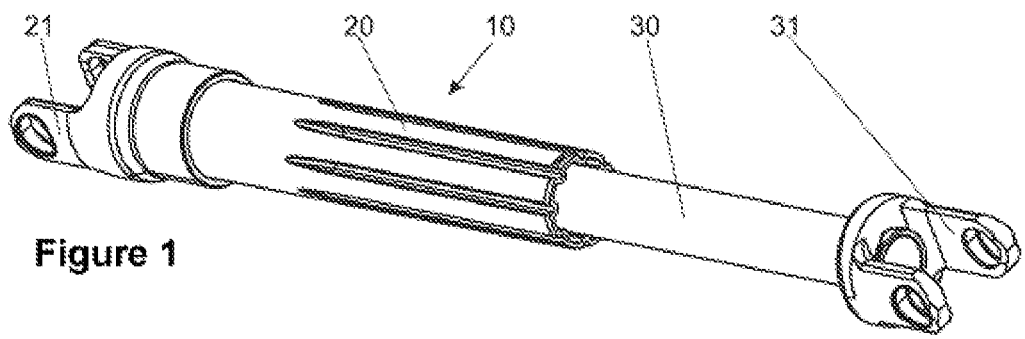
FIG. 1 is a schematic perspective view of an example steering shaft.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Starting from the known prior art, one problem which the present invention proposes to solve is to provide an improved method for the production of a profiled hollow shaft for a telescopic steering shaft of a motor vehicle.

Accordingly, a method is indicated for producing a profiled hollow shaft for a telescopic steering shaft of a motor vehicle, involving the providing of a hollow shaft to be processed and a profile mandrel and a roller head comprising at least one roller, wherein the profile mandrel is first introduced into the hollow shaft in order to produce a groove in the hollow shaft and then the hollow shaft is moved relative to the roller head. According to the invention, a movement of the hollow shaft relative to the roller head is carried out exclusively in the direction of the longitudinal axis of the hollow shaft in order to form a groove.

Since there is no continual rotary movement of the profile mandrel and the hollow shaft relative to the roller head, a relatively short machining time is required to form the groove in the hollow shaft. On the whole, this results in relatively short cycle times to form the at least one groove in the hollow shaft. The complexity of the fabrication is also reduced by the eliminating of a continual rotary movement of the hollow shaft relative to the roller head during the machining of the hollow shaft. In particular, a costly coordination of a rotational movement and an axial movement of the hollow shaft relative to the roller head is no longer necessary.

The roller of the roller head preferably comprises a defined and unchanging radial distance from the hollow shaft, at least for the production cycle. In other words, there is no feeding of the roller in terms of the radial distance to the hollow shaft or the value of the feed movement is constant for the duration of the particular production process. The hollow shaft comprises an outer circumferential surface with an outer diameter, while the radial distance of the roller is less than the outer diameter of the hollow shaft. Thus, during the relative displacement of the hollow shaft to the roller head in the direction of the longitudinal axis, the roller acts on the outer circumferential surface of the hollow shaft such that the material of the hollow shaft is displaced, thereby forming the at least one groove in the hollow shaft.

On the whole, the method enables a simplified production, especially for rough tooth forms on hollow shafts. Since it is only necessary to move the hollow shaft in the direction of its longitudinal axis relative to the roller head in order to form a groove in the hollow shaft, the machining can easily be done in a cold rolling method.

In one preferred embodiment, the profile mandrel is moved together with the hollow shaft and the movement of the profile mandrel and the hollow shaft relative to the roller head is carried out exclusively in the direction of the longitudinal axis of the hollow shaft.

Thanks to the joint movement of the profile mandrel and the hollow shaft, the friction present between the profile mandrel and the hollow shaft is minimized, since no relative displacement occurs between the profile mandrel and the hollow shaft during the working of the roller of the roller head on the hollow shaft and the associated formation of the at least one groove.

In another preferred embodiment, the at least one groove with a groove length on the hollow shaft is created by a continuous advancing movement of the hollow shaft relative to the roller head along the groove length, wherein the roller of the roller head rolls along the hollow shaft in the longitudinal direction.

By the continuous advancing movement is meant a relative movement of the hollow shaft to the roller head over the entire groove length with no reversal of direction. Preferably, the movement occurs with a constant speed or with a defined velocity profile.

If the groove is created on the hollow shaft by a continuous advancing movement, it is enough to move the hollow shaft once in the longitudinal direction relative to the roller head and in particular relative to the roller of the roller head. In this case, the roller acts with a force on the hollow shaft in order to form the groove on it. Accordingly, the required machining time to create a groove on the hollow shaft can be reduced. Since the roller of the roller head rolls only in the direction of the longitudinal axis along the hollow shaft, there is a simple relative movement between the hollow shaft and the roller head, not requiring any costly coordination.

The creation of at least one groove on the hollow shaft can preferably be carried out by a double travel movement of the hollow shaft relative to the roller head. This has the advantage that no additional movements are needed in order to separate the hollow shaft with the mandrel from the roller head or move it out from this. Accordingly, the hollow shaft together with the mandrel is brought into contact with the roller of the roller head by an advancing movement relative to the roller head and a groove is created in the hollow shaft in the direction of the longitudinal axis of the hollow shaft. Upon reaching the desired groove length, the advancing movement is ended. Then there occurs a return travel movement, during which the hollow shaft together with the profile mandrel is moved in the opposite direction to the advancing movement relatively in the direction of the longitudinal axis of the hollow shaft. During the return travel movement, the groove created during the advancing movement is again rolled by the roller of the roller head.

In another preferred embodiment the hollow shaft is then retracted relative to the roller head. In this way, the contact between the roller of the roller head and the hollow shaft can be separated. Accordingly, a rolling process to create a groove in the hollow shaft can be concluded. This is especially advantageous when the groove length is less than the length of the hollow shaft or in other words when the groove is formed only partly on the hollow shaft.

In another preferred modification all grooves present in the hollow shaft are created by a common work step with a continuous advancing movement.

Preferably, for each groove created on the hollow shaft there is provided a separate roller in the roller head, while the rollers for the generating of the grooves roll along the hollow shaft at the same time.

In this way, it is possible to create several grooves in the hollow shaft all at once in the direction of the longitudinal axis of the hollow shaft.

In this way, the entire forming process to generate the grooves in the hollow shaft can be performed by means of an axial relative movement of the profile mandrel and the hollow shaft with respect to the rollers of the roller head. This produces a significant time saving, so that significantly shorter cycle times are possible as compared to traditional fabrication methods for the profiling of the hollow shaft or the forming of the grooves in the hollow shaft.

Furthermore, a simultaneous forming of the grooves being created in the hollow shaft in the case of a symmetrical arrangement of the grooves in the hollow shaft can result in a substantially symmetrical application of force of the rollers of the roller head in the radial direction on the hollow shaft or the profile mandrel. This is especially advantageous for the design of the roller head. Thus, a symmetrical force curve means that there are lower demands on the supporting action of the individual components of the roller head. Thus, the symmetrical force curve significantly reduces the moments arising in a bearing system of the roller head, which may lead to a reduction in the design and manufacture costs of the roller head.

Moreover, a symmetrical force application also has a positive effect on the properties of the profiled hollow shaft. Thus, the hollow shaft experiences uniform bending processes during the cold forming, so that uniform grooves are produced on the hollow shaft. The result is a symmetrical body of revolution with a homogeneous material distribution.

The providing of a separate roller in the roller head for each groove being created in the hollow shaft thus makes unnecessary a rotational movement of the profile mandrel and the hollow shaft. In this way, on the one hand, the machining time to create a profiled hollow shaft and on the other hand the complexity of the method for production of the profiled hollow shaft can be reduced.

The present invention is also solved by a method with the features of claim 6. Advantageous embodiments will emerge from the dependent claim.

Accordingly, a method is indicated for producing a telescopic steering shaft for a motor vehicle, wherein an inner hollow shaft with its groove profile is introduced into an outer hollow shaft with a groove profile, wherein the groove profile of the outer hollow shaft is calibrated to the groove profile of the inner hollow shaft by means of at least one roller in a continuous advancing movement along the longitudinal axis of the steering shaft.

Because rollers are acting on the groove profile of the outer hollow shaft, the groove profile of the outer hollow shaft fits snug against the groove profile of the inner hollow shaft. Thanks to the snug fit, the play present between the inner and outer hollow shaft is minimized, so that a telescopic steering shaft with little play and smooth movement can be provided.

Furthermore, a profile mandrel can preferably be introduced into the inner hollow shaft, wherein the profile mandrel serves for internal support and thus counteracts an unwanted deformation of the inner and outer hollow shaft. Moreover, it is conceivable and possible for the inner and outer hollow shaft to be telescoped relative to each other in their longitudinal direction while the at least one roller is calibrating the grooves of the outer hollow shaft. This can preferably be done in an oscillating manner, so that a back and forth motion is executed. Tests have shown that this oscillating movement results in further minimization of the play. Furthermore, it has been shown that a lubricant present between the inner hollow shaft and outer hollow shaft is optimally distributed.

In another preferred modification, prior to introducing the inner hollow shaft into the outer hollow shaft a plastic sleeve is placed on the inner hollow shaft, which is arranged between the hollow shafts after the inserting of the hollow shaft, the three components being calibrated relative to each other.

The plastic sleeve enables better sliding properties during the telescoping of the steering shaft. Thanks to the calibrating of the three components relative to each other, an especially low-play and torsion-stiff steering shaft can be provided on account of the reduction of play in the groove profile of the outer hollow shaft.

The present invention is also solved by a steering shaft with the features of the independent claim. Advantageous embodiments will emerge from the dependent claims.

Accordingly, a steering shaft for a motor vehicle is indicated which comprises an inner shaft and an outer shaft, being arranged coaxially to each other and being telescopic to each other, wherein the inner shaft and the outer shaft have a profile of grooves corresponding to each other. According to the invention, at least one of the two shafts of the steering shaft is produced according to the above-mentioned method.

Accordingly, it is possible to produce a steering shaft for a motor vehicle which is distinguished by shorter cycle times and a more cost-favorable fabrication process. For example, this steering shaft can be designed as an intermediate steering shaft, wherein this intermediate steering shaft comprises at least one universal joint, or as a steering spindle, wherein such a steering spindle is mounted rotatably in a steering column and comprises a coupling segment for connecting a steering wheel.

In one preferred embodiment, a flank angle $\alpha$ of the grooves in the outer shaft and/or the inner shaft and the flank angle $\alpha$ of a profile top of an internal toothing of the outer shaft and/or the inner shaft amounts to 45° to 75°, preferably 55° to 65° and especially preferably 60°.

The angle $\alpha$ corresponds to the angle of the two tooth flanks of a tooth of an internal toothing of the outer shaft. Two opposing tooth flanks of an external toothing of the inner shaft have the same angle $\alpha$. The opposing tooth flanks at the same time form the side walls of a groove created in the inner shaft. In this way, it is possible for a tooth of the internal toothing of the outer shaft to correspond to a groove of the external toothing of the inner shaft.

A flank angle $\alpha$ of 45° to 75° allows the inner shaft and the outer shaft to be brought to bear in form fit for the transmittal of torque and at the same time they can be displaced in the direction of the longitudinal axis of the steering shaft. The flank angle $\alpha$ of 45° to 75° moreover makes it possible for the inner shaft and the outer shaft to transmit between themselves the torsional forces acting on the steering shaft and at the same time have a low risk of a jamming of the inner shaft and the outer shaft due to a recoil motion of the flanks, which may result in an impaired mobility relative to each other in the longitudinal direction. Investigations have shown that a preferred flank angle $\alpha$ of 55° to 65° improved the results in terms of tolerance susceptibility of the mutually telescopic inner and outer shaft and the torsional stiffness. The optimal flank angle $\alpha$ was found to be an angle with the value of 60°. This optimal flank angle showed less play between the inner and outer shaft and high torsional stiffness.

In another preferred embodiment, the ratio of the difference of an inner diameter of a profile top of an external toothing and an inner diameter of a groove bottom of an internal toothing of the inner shaft and/or the outer shaft to a material thickness of the inner shaft and/or the outer shaft is between 1 and 4.

Tests have shown that the ratio preferably lies between 1.5 and 3.5 and especially preferably between 2 and 3, since ideal conditions are then present for introducing the groove according to the aforementioned method.

In order for the steering shaft to provide the required minimum degree of torsional stiffness, a minimum wall thickness of the inner shaft and/or the outer shaft should be observed, amounting to 25% of the difference of the inner diameter of a tooth of the external toothing and the inner diameter of a tooth of the internal toothing of the inner shaft and/or the outer shaft.

In one preferred modification, the inner shaft and/or the outer shaft prior to the introducing of the at least one groove comprises an at least partly circular cylindrical or a polygonal hollow cross sectional profile in relation to the shaft longitudinal axis.

In order to achieve a secure torque transmittal in event of misuse, the hollow cross section is preferably a three flat or four flat shape.

In one preferred modification, a sleeve with a profile is arranged between the inner shaft and the outer shaft, corresponding to the profile of the inner shaft and the profile of the outer shaft.

The sleeve helps reduce or prevent play between the contact surfaces of the inner shaft and the outer shaft. Furthermore, the sleeve can enable an easy movement of the inner shaft relative to the outer shaft. Accordingly, the sleeve can make it possible to adjust the steering shaft to a low and constant force level.

In another preferred embodiment, the sleeve is made of plastic. In this way, it is possible in a quick and easy manner to adapt the inner profile of the sleeve and the outer profile of the sleeve exactly to the profile of the inner shaft and the outer shaft, in order to achieve a lengthwise displacement of the steering shaft with a defined force level. Moreover, a plastic sleeve enables a reduction in the noise produced during use of the steering shaft.

In the following, preferred sample embodiments shall be described with the aid of the figures. The same, similar, or equivalent elements shall be designated with identical reference numbers. To avoid redundancy, no repeat description of these elements will be provided at places in the following description.

FIG. 1 shows a steering shaft 10 for a motor vehicle. The steering shaft 10 comprises an outer shaft 20 and an inner shaft 30, which are telescopic in regard to each other. At an outer end, the outer shaft 20 comprises a fork 21, representing a portion of a universal joint, not shown, in order to integrate the steering shaft 10 into a steering train. Also the inner shaft 30 comprises at an outer end a fork 31, representing a portion of a universal joint, not shown, in order to integrate the steering shaft 10 into the steering train.

The outer shaft 20 and the inner shaft 30 are hollow shafts, made of a steel with good forming properties. Alternatively, the outer shaft 20 and the inner shaft 30 can also be made from aluminum alloys, refined steel, or the like.

Figure 2:
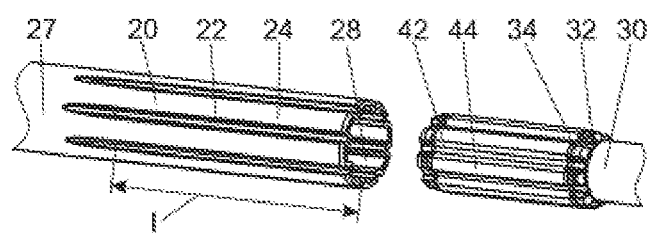
FIG. 2 is a schematic view of a portion of an outer shaft and a portion of an inner shaft of the example steering shaft in FIG. 1.

FIGS. 1 and 2 show that the outer shaft 20 is profiled in the region serving to accommodate the inner shaft 30. Accordingly, the outer shaft 20 comprises grooves 22 in this region, running in the axial direction of the outer shaft 20. The grooves 22 with a groove length l on the outer circumferential surface 27 of the outer shaft 20 form an internal toothing on the inner circumferential surface 28 of the outer shaft 20. FIG. 2 shows that an end segment of the inner shaft 30, which in an operating state is inserted into the outer shaft 20, comprises an external toothing which corresponds to the internal toothing of the outer shaft 20. The external toothing of the inner shaft 30 is formed by grooves 32 on an outer circumferential surface 37 of the inner shaft 30. On the external toothing of the inner shaft 30 there is arranged a sleeve 40, corresponding both to the external toothing of the inner shaft 30 and the internal toothing of the outer shaft 20. The sleeve 40 is press-fitted onto the inner shaft 30, so that the sleeve 40 can move together with the inner shaft 30 relative to the outer shaft 20 inside it. In one embodiment not represented, the sleeve 40 is axially fixed to the inner shaft 30 by a caulking. In order to comply with the stiffness requirements of the steering shaft 10, a very slight play exists between the inner shaft 30 or the sleeve 40 and the outer shaft 20, so that it can almost be called play-free. Instead, a sliding fit is provided between the inner shaft 30 or the sleeve 40 and the outer shaft 20, allowing an adjustment of the length of the steering shaft 10 to a very low and constant force level.

Figure 3:
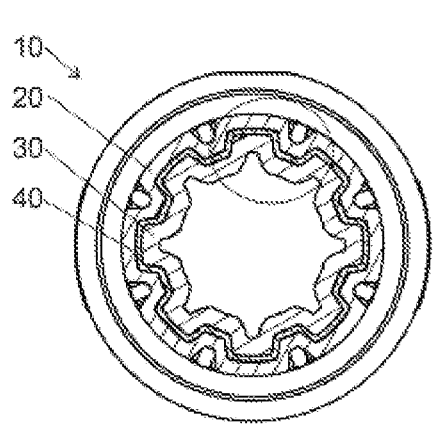
FIG. 3 is a schematic cross sectional view of the example steering shaft of FIGS. 1-2.
Figure 4:
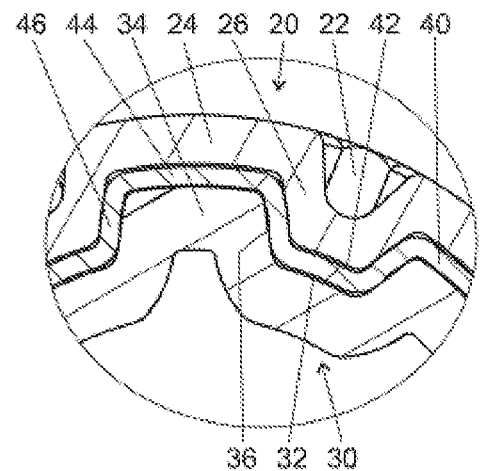
FIG. 4 is a schematic detail view of the example steering shaft of FIG. 3.
Figure 5:
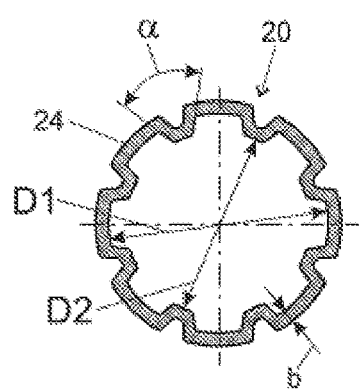
FIG. 5 is a schematic cross sectional view of an example outer shaft.
Figure 6:
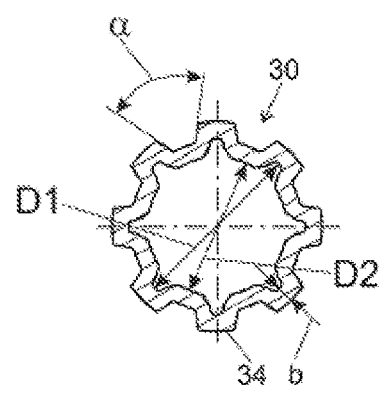
FIG. 6 is a schematic cross sectional view of an example inner shaft.

FIGS. 3 and 4 are cross sectional views through the steering shaft 10. One can see that the profile of the outer shaft 20 corresponds to the profile of the sleeve 40 or the inner shaft 30. Thus, for example, the groove 22 of the outer shaft 20 matches up with the groove 42 of the sleeve 40 or the groove 32 of the inner shaft 30. The flanks 26, 46, 36 respectively adjoining the grooves 22, 42, 32 extend, as shown in FIGS. 5 and 6, from the groove bottom in each case at the same angle. Therefore, as shown in FIG. 4, the flanks 26, 36, 46 of the outer shaft, the sleeve and the inner shaft extend almost parallel to each other and the flow of force between the inner shaft 30 and the outer shaft 20 occurs only via the flanks 26, 36, 46. In the region outside of the flanks 26, 36, 46 there is no force-transmitting contact between the inner shaft 30, the sleeve 40 and the outer shaft 20.

Furthermore, FIGS. 3 and 4 show that a profile top 44 of the sleeve 40 borders on an inner circumferential surface of the profile top 24 of the outer shaft 20. In turn, a profile top 34 of the inner shaft 30 borders on the inner circumferential surface of the profile top 44.

Thanks to the mutually corresponding profiles of the outer shaft 20, the sleeve 40 and the inner shaft 30, the outer shaft 20 engages indirectly with the inner shaft 30 via the sleeve 40. Thus, it is possible to provide a transmittal of torque between the outer shaft 20 and the inner shaft 30.

Figure 7:
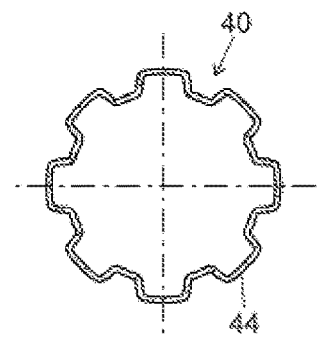
FIG. 7 is a schematic cross sectional view of an example sleeve.

FIGS. 5, 6 and 7 show separately the profile cross sections of the outer shaft 20, the inner shaft 30 and the sleeve 40. FIGS. 5 and 6 show an inner diameter of the profile top D1, an inner diameter of the groove D2 and a flank angle α. In order to provide a minimum degree of torsional stiffness, the ratio of the difference of the inner diameter of the profile top D1 and the inner diameter of the groove D2 to a material thickness b should be between 1 and 4, preferably between 1.5 and 3.5 and especially preferably between 2 and 3.

Figure 8:
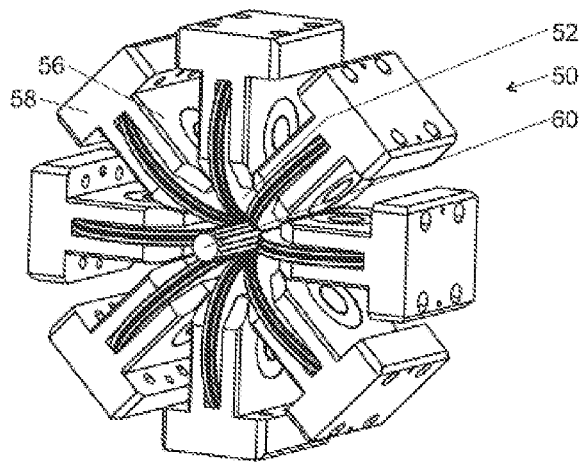
FIG. 8 is a schematic perspective view of an example roller head.
Figure 9:
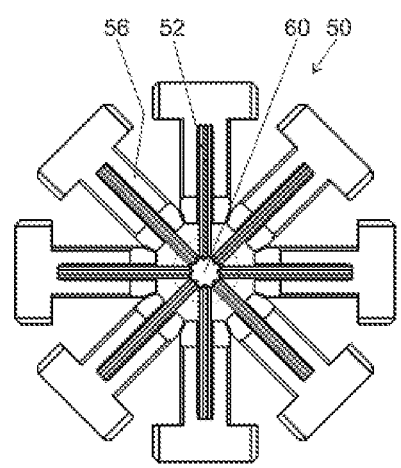
FIG. 9 is a schematic top view of the roller head of FIG. 8.

FIGS. 8 and 9 show a roller head 50 for the production of the above-described outer shaft. The roller head for production of the above-described inner shaft has a similar construction to the roller head 50 for the production of the outer shaft. The roller head 50 comprises eight rollers 52, which are arranged in the form of a star about a rolling axis. The rollers 52 are arranged relative to each other at an angle of 45°. Each roller 52 is mounted by two bearing cheeks 56. The two bearing cheeks 56 of a roller 52 are joined together by a roller bearing foot 58. The roller bearing foot 58 comprises bores 59 for fastening on a frame of the roller head 50.

FIGS. 8 and 9 show a profile mandrel 60, which is arranged in the middle of the eight rollers 52. Between the profile mandrel 60 and the rollers 52 there is provided a gap, so that the profile mandrel 60 can be moved along the rolling axis without the rollers 52 rolling against the profile mandrel 60.

Alternatively, the roller head can also comprise one, two, three, four, five, six, seven, nine, ten, eleven, twelve or more rollers 52, arranged spaced apart around the periphery with a corresponding angle to each other.

Figure 10:
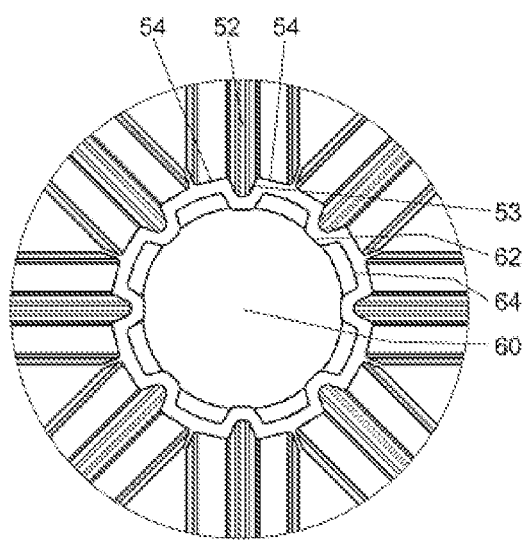
FIG. 10 is a schematic detail view of the top view of the roller head shown in FIG. 9.

FIG. 10 is an enlarged view of the profile mandrel 60, there being provided a gap between the profile mandrel 60 and the rollers 52 corresponding to the profile of a shaft being produced by means of the roller head 50.

Figure 11:
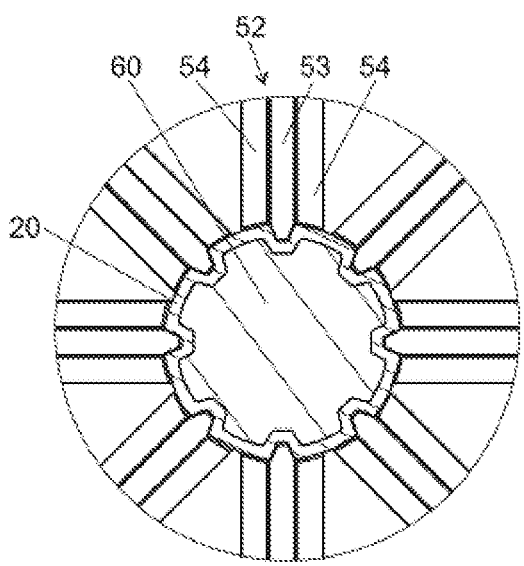
FIG. 11 is a schematic sectional view of the roller head of FIG. 10.

FIGS. 10 and 11 show that the rollers 52 are profiled and comprise a roller center profile 53 and a roller edge profile 54. The diameter of the roller center profile 53 here is greater than the diameter of the roller edge profile 54. The rollers 52 and the profile mandrel 60 are arranged with respect to each other such that a roller center profile 53 corresponds to a groove 62 of the profile mandrel 60. Moreover, the roller edge profiles 54 correspond to the profile tops 64 of the profile mandrel 60.

FIG. 11 shows a cross section of a detailed view of a roller head 50, the rollers 52 being in contact with an outer shaft 20, which has been shoved onto the profile mandrel 60. The outer shaft 20 here is being cold rolled, so that the outer shaft 20 receives on its inner circumferential surface the profile of the profile mandrel 60 and is formed on its outer circumferential surface by the rollers 52 and especially the roller profile.

Since the roller center profile 53 corresponds to the groove 52 of the profile mandrel, the material of the outer shaft 20 is pressed by the roller center profile 53 into the groove 62 of the profile mandrel 60. The roller edge profiles 54 roll along the profile tops 24 of the outer shaft 20, enabling a more intensive force application of the rollers 52 against the outer shaft 20 and a better formation of the internal toothing of the outer shaft 20. Alternatively, the inner shaft of a steering shaft can also be fabricated by means of a roller head so described.

Figure 13:
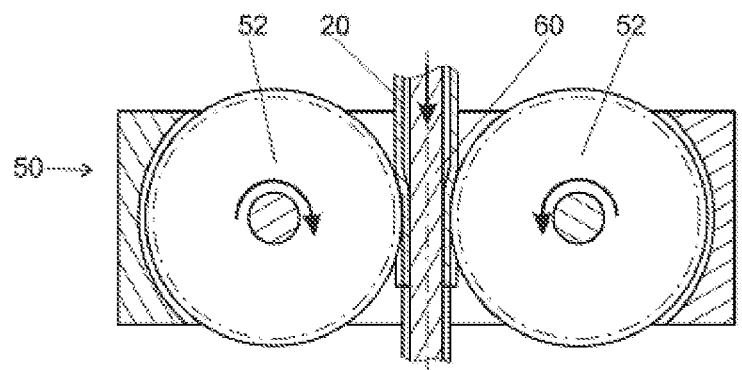
FIG. 13 is a schematic sectional view of the roller head of FIGS. 8-12, wherein a hollow shaft is located in the roller head.
Figure 12:
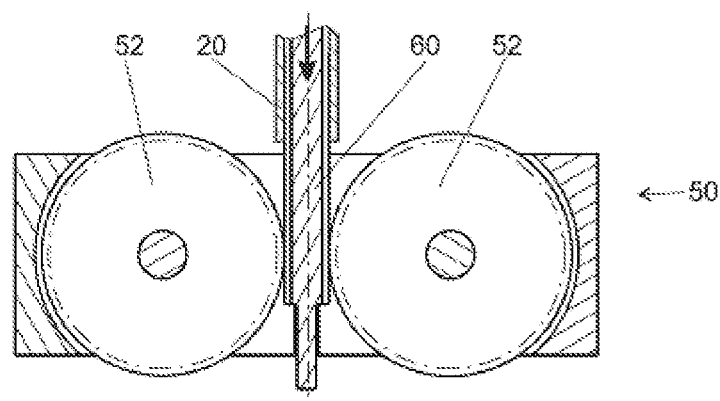
FIG. 12 is a schematic sectional view through the roller head of FIGS. 8-11, wherein a sectioning cut runs along a longitudinal axis of a profile mandrel.
Figure 14:
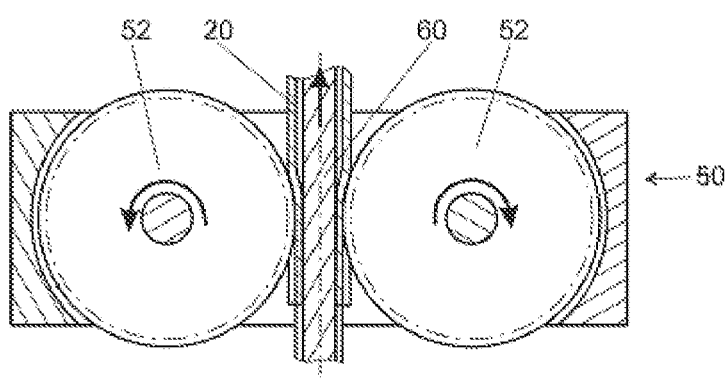
FIG. 14 is a schematic sectional view of the roller head of FIGS. 8-13, wherein a hollow shaft is located in the roller head.

FIGS. 12 to 14 show the movements of a double travel movement for the profiling of the outer shaft 20. These are cross sectional views, each time showing two oppositely situated rollers 52, with a profile mandrel 60 arranged between the rollers 52, onto which an outer shaft 20 has been shoved.

FIG. 12 shows an advancing movement of the profile mandrel 60. The profile mandrel 60 is moved relative to the rollers 52. No contact exists between the profile mandrel 60 and the rollers 52, so that the rollers 52 remain in a position of rest. The outer shaft 20 shoved onto the profile mandrel 60 is not yet in contact with the rollers 52 in FIG. 12.

FIG. 13 shows the profile mandrel 60 together with the outer shaft 20 still in the advancing movement, with the difference that now the outer shaft 20 makes contact with the rollers 52. The gap between the profile mandrel 60 and the rollers 52 is now filled up by the outer shaft 20. Thanks to the advancing movement of the profile mandrel 60 together with the outer shaft 20, the rollers 52 are placed in rotation. They roll along the outer circumferential surface of the outer shaft 20, so that the outer shaft 20 is given the above-described profiling, as the rollers 52 in the roller center profile 53 have a shorter distance from the profile mandrel 60 than the as yet unformed outer shaft 20.

Once the desired length of the profiling and the associated groove length l of the outer shaft 20 has been reached, the return travel movement indicated in FIG. 14 commences. The profile mandrel 60 and the outer shaft 20 move jointly in the opposite direction in relation to the advancing movement. Contact continues to exist between the outer shaft 20 and the rollers 52, so that the rollers 52 also rotate in the opposite direction during the return travel movement. The return travel movement can be maintained until the outer shaft 20 and the profile mandrel 60 have left the roller head 50. Alternatively, a new advancing movement can follow the return travel movement, for example in order to improve the quality of the profiling of the outer shaft. In order to improve the rolling of the rollers against the shaft being profiled and minimize the pitting in the contact surfaces, it is conceivable and possible to wet the rollers or the shaft with a lubricant on the corresponding contact surface.

Figure 15:
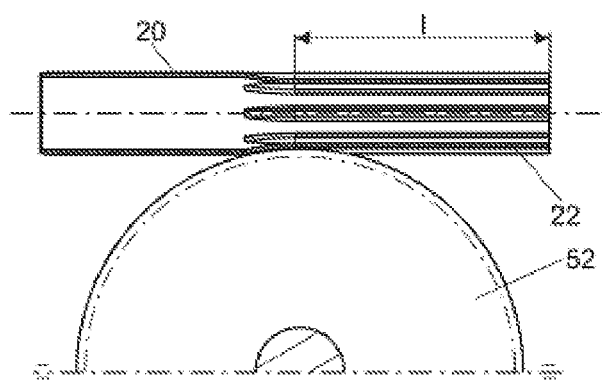
FIG. 15 is a schematic sectional view of an example hollow shaft making contact with a roller of the roller head.

FIG. 15 shows a sectional view of the outer shaft 20 and a roller 52, where the outer shaft 20 is at a reversal point from advancing movement to return travel movement relative to the roller 52. The grooves 22 here have the groove length l. In the example, the roller 52 is rolled along the groove length l continuously from the free end of the shaft 20 to the end of the groove 22. After this, the roller 52 is rolled back continuously from the reversal point at the end of the groove length l. In this way, the complex tube geometry is produced with a very simple rolling process.

Insofar as is applicable, all individual features which are represented in the individual sample embodiments can be combined with and/or exchanged for each other, without leaving the scope of the invention.

LIST OF REFERENCE NUMBERS

10 Steering shaft
20 Outer shaft
21 Fork
22 Groove
24 Profile top
26 Flank
27 Outer circumferential surface
28 Inner circumferential surface
30 Inner shaft
31 Fork
32 Groove
34 Profile top
36 Flank
37 Outer circumferential surface
40 Sleeve
42 Groove
44 Profile top
46 Flank
50 Roller head
52 Roller
53 Roller center profile
54 Roller edge profile
56 Roller bearing cheek
58 Roller bearing foot
60 Profile mandrel
62 Groove
64 Profile top
66 Flank
D1 Inner diameter of a profile top
D2 Inner diameter of a groove bottom
b Material thickness
α Flank angle
l Groove length

What is claimed is:

1. A method for producing a telescopic steering shaft of a motor vehicle, the method comprising:
    providing an outer hollow shaft to be calibrated, an inner hollow shaft, a profile mandrel, and a roller head, the roller head having a plurality of rollers fixed in position thereon, each of the plurality of rollers disposed between a pair of bearing cheeks, wherein each of the plurality of rollers includes a roller edge profile configured to contact and shape the outer hollow shaft;
    introducing the profile mandrel into the inner hollow shaft; and
    telescoping or oscillating the inner and outer hollow shafts relative to one another as the roller head is calibrating grooves of the outer hollow shaft, wherein all of the plurality of rollers share a common axial position on a longitudinal axis of the inner and outer hollow shafts to calibrate with the roller edge profiles the grooves simultaneously in the outer hollow shaft.

2. The method of claim 1 comprising moving the profile mandrel together with the inner hollow shaft, wherein movement of the profile mandrel and the inner hollow shaft relative to the roller head occurs exclusively in the direction of the longitudinal axis of the hollow shaft.

3. The method of claim 1 wherein the rollers of the roller head roll along the hollow shaft in the longitudinal direction.

4. The method of claim 1 further comprising retracting the outer hollow shaft relative to the roller head.

5. The method of claim 1 wherein grooves are created on the inner hollow shaft by a common work step involving a continuous advancing movement.

* * * * *